D. B. Clayton, Egg Beater.

No. 117,982 — Patented Aug. 15 1871

Witnesses:
M. Vorlender
Wm. H. C. Smith

Inventor:
D. B. Clayton
Per ——— Attorneys.

UNITED STATES PATENT OFFICE.

DANIEL B. CLAYTON, OF COLUMBIA, SOUTH CAROLINA.

IMPROVEMENT IN EGG-BEATERS.

Specification forming part of Letters Patent No. 117,982, dated August 15, 1871.

*To all whom it may concern:*

Be it known that I, DANIEL B. CLAYTON, of Columbia, in the county of Richland and State of South Carolina, have invented a new and Improved Egg-Beater; and I do hereby declare that the following is a full, clear, and exact description thereof, which will enable others skilled in the art to make and use the same, reference being had to the accompanying drawing forming part of this specification.

This invention relates to improvements in horizontally-revolving egg-beaters; and it consists in a suitable vessel and beater-operating devices, in which the blades, which are caused to move very rapidly, are arranged to cut edgewise against the egg in a way to separate it into very fine particles, and introduce the air more thoroughly than can be done by the beaters now in use, all as hereinafter described.

Figure 1:
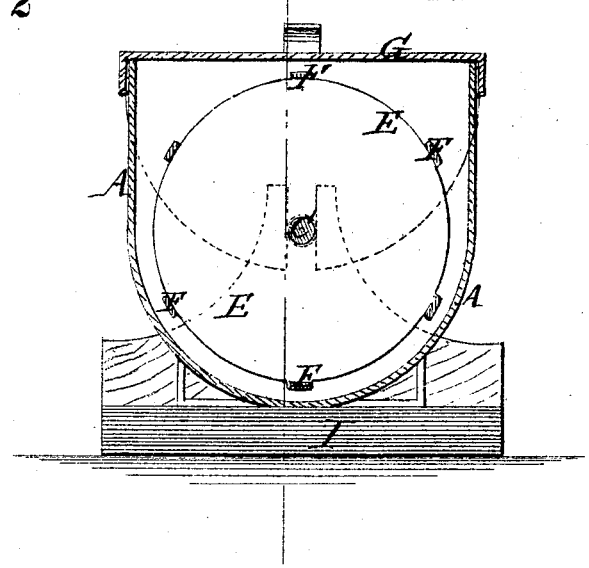
Figure 2:
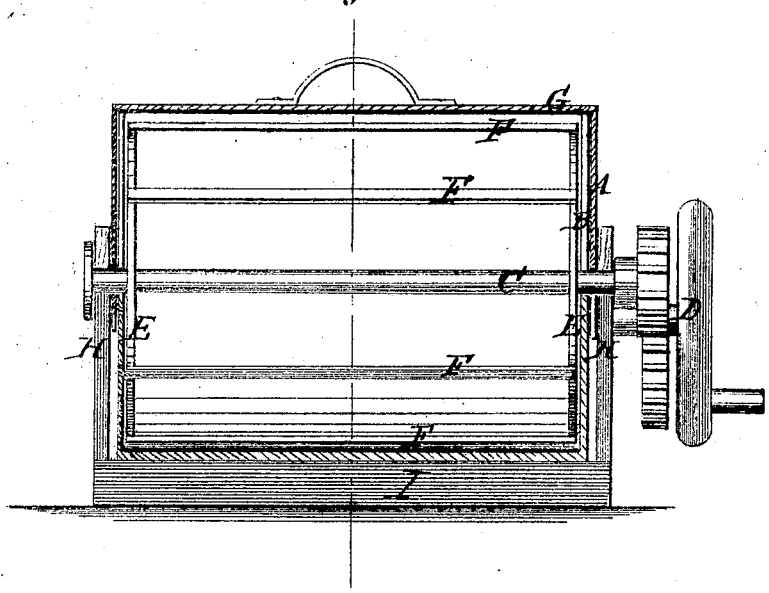

Figure 1 is a transverse sectional elevation of my improved machine, and Fig. 2 is a longitudinal sectional elevation.

Similar letters of reference indicate corresponding parts.

A is a concave trough or other vessel, with closed ends and high vertical sides above the concave part, the ends being slotted, as shown at B, for the admission of the shaft C carrying the beaters. This shaft is geared with a crank-shaft, D, so as to have rapid motion imparted to it, and it carries disks E; or it may be arms just inside of the ends of the trough, whereon the flat thin beaters F are mounted, as indicated, so as to enter the substance to be beaten edgewise, which I find separates it finely and quickly, and admits the air more thoroughly than any other arrangement of beaters known to me, especially those in which round wire is employed for the beaters. G is a cover of sheet metal or other suitable substance, fitted to the vessel for closing down in it in the manner of the cover of a sheet-metal can or pail; or it may be shut over the vessel, as may be preferred.

When the cover is raised off from the trough or vessel the beaters may be lifted out, leaving the beaten egg in the vessel, wherein other substances for making cake or other compound may be placed and mixed conveniently.

In this example bearings are provided for the shaft at the ends of the vessel A, said bearings rising up from a stand or bed, I, whereon the said vessel rests; but the said bearings may be attached to the end of the vessel and the bed I dispensed with, if preferred.

Having thus described my invention, I claim as new and desire to secure by Letters Patent—

As an improved article of manufacture, an egg-beater, comprising the vessel or trough A, the horizontal shaft C, disks or arms E, thin flat beaters F, cover G, and the driving-gear, all constructed and arranged substantially as specified.

DANIEL B. CLAYTON.

Witnesses:
   M. A. PARK,
   W. B. STANLEY.